UNITED STATES PATENT OFFICE.

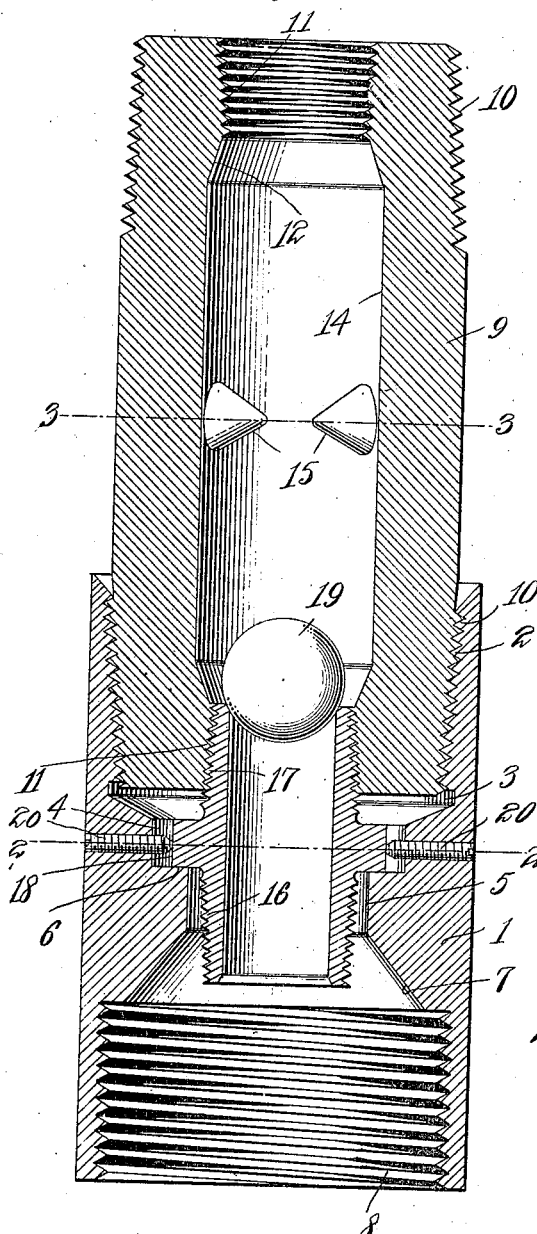

GEORGE W. SLAUGHTER, JR., OF SOURLAKE, TEXAS, ASSIGNOR OF ONE-HALF TO LEE WILKINSON, OF SOURLAKE, TEXAS.

STAND-VALVE FOR OIL-WELL PUMPS.

1,279,599.

Specification of Letters Patent.

Patented Sept. 24, 1918.

Application filed September 20, 1917. Serial No. 192,382.

*To all whom it may concern:*

Be it known that I, GEORGE W. SLAUGHTER, Jr., a citizen of the United States, residing at Sourlake, in the county of Hardin and State of Texas, have invented a new useful Stand-Valve for Oil-Well Pumps, of which the following is a specification.

The device forming the subject matter of this application is a ball seat adapted to be used in an oil well pump.

By way of explanation it may be stated that, in devices of this kind, considerable difficulty has been experienced heretofore, on account of the fact that the ball seat works loose. The present invention, therefore, aims to provide novel means whereby the seat may be held securely in place. Another object of the invention is so to construct certain parts of the structure, that, at the will of an operator, they can be turned end for end, thereby materially lengthening the working life of the said parts.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Figure 1 shows in longitudinal section, a structure constructed in accordance with the present invention, parts appearing in elevation;

Fig. 2 is a cross section on the line 2—2 of Fig. 1;

Fig. 3 is a cross section on the line 3—3 of Fig. 1.

In the drawings, the device hereinafter claimed is shown as comprising a tubular body 1 provided at its upper end with a tapered threaded socket 2, below which is located an enlarged recess 3 communicating with a reduced bore 4 which, in its turn, communicates with a bore 5, still further reduced, thereby to define an internal shoulder 6. The bore 5 has a flaring extension 7 communicating with a cylindrical threaded socket 8.

The numeral 9 denotes a nipple having threaded tapered ends 10, either one of which may be threaded into the tapered socket 2 of the body 1. At its ends, the nipple 9 is supplied with tapered sockets 11, connected, by means of tapered bores 12, with the main bore 14 of the nipple 9. In its interior, the nipple 9 is supplied with projections 15, located intermediate the ends of the nipple and projecting into the main bore 14 thereof.

The numeral 16 denotes a tubular valve seat, the ends 17 of which are tapered and threaded, so that either of the said ends may be engaged with one of the tapered sockets 11 of the nipple 9, as shown in Fig. 1. Intermediate its ends, the tubular seat 16 is supplied with a laterally projecting flange 18 which, as shown in Fig. 2, may be of hexagonal form, to facilitate the turning of the seat 16 by means of a wrench. The flange 18 may abut against the shoulder 6 as shown in Fig. 1 of the drawings.

A ball valve 19 is supported on the upper end of the seat 16, within the bore 14 of the nipple 9, and lies below the projections 15, which act as stops for the ball valve.

Ordinarily, the flange 18 abuts against the shoulder 6 and is bound firmly thereagainst when the nipple 9 is advanced into the body 1. In order, however, to prevent positively, a rotation of the seat 16 and a consequent loosening thereof, clamping means, such as set screws 20, may be threaded into the body 1, the set screws bearing against the edge of the flange 18 of the seat 16.

The device hereinbefore described, is so constructed that the seat 16 will be held securely in place. It is possible, however, to take the structure apart readily, to permit a renewing of the ball valve 19, and since the elements 16 and 9 are tapered at both ends, a reversal of these parts, and a consequent lengthening of their working life, is possible.

Having thus described the invention, what is claimed is:—

1. In a device of the class described, a body having a tapered socket and provided with an internal shoulder; a nipple having like tapered ends, one of which is threaded into the socket, the nipple having a bore provided at its ends with like tapered sockets, the nipple being supplied intermediate its ends with a projection extended into the bore; a seat having like tapered ends, one of which is threaded into one socket of the nipple, the seat having a flange engaging the shoulder; and a ball valve supported on the seat and located in the bore of the nipple, below the projection.

2. In a device of the class described, a body having a tapered socket; a nipple having like tapered ends, one of which is threaded into the socket, the nipple having a bore provided at its ends with like tapered sockets, the nipple being supplied intermediate its ends with a projection extended into the bore; a seat having like tapered ends, one of which is threaded into one socket of the nipple; a ball valve supported on the seat and located in the bore of the nipple below the projection; and a clamping means carried by the body and engaging the seat intermediate the ends thereof.

In testimony that I claim the foregoing as my own, I have hereto affixed my signature in the presence of two witnesses.

GEORGE W. SLAUGHTER, Jr.

Witnesses:
 RHEA HUDNELL,
 C. T. STUTZ.